US012510855B2

(12) United States Patent
Tani

(10) Patent No.: US 12,510,855 B2
(45) Date of Patent: Dec. 30, 2025

(54) DRIVING CONTROL APPARATUS AND IMAGE-FORMING APPARATUS

(71) Applicant: CANON KABUSHIKI KAISHA, Tokyo (JP)

(72) Inventor: Masaki Tani, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/643,142

(22) Filed: Apr. 23, 2024

(65) Prior Publication Data

US 2024/0377778 A1 Nov. 14, 2024

(30) Foreign Application Priority Data

May 10, 2023 (JP) ................................ 2023-078039

(51) Int. Cl.
*G03G 15/00* (2006.01)

(52) U.S. Cl.
CPC ..... *G03G 15/5008* (2013.01); *G03G 15/5004* (2013.01); *G03G 15/5045* (2013.01)

(58) Field of Classification Search
CPC ........... G03G 15/5008; G03G 15/5004; G03G 15/5045; G03G 2221/1657; G03G 21/1647
See application file for complete search history.

(56) References Cited

U.S. PATENT DOCUMENTS

| | | | | |
|---|---|---|---|---|
| 8,336,874 | B2 | 12/2012 | Kato et al. | |
| 8,575,789 | B2 | 11/2013 | Kubo | |
| 9,284,138 | B2 | 3/2016 | Hino | |
| 2009/0238621 | A1 * | 9/2009 | Kubo | G03G 15/80 399/388 |
| 2017/0131662 | A1 * | 5/2017 | Iwakoshi | G03G 21/1647 |

FOREIGN PATENT DOCUMENTS

| | | | |
|---|---|---|---|
| JP | S63318720 | A | 12/1988 |
| JP | 2009149385 | A | 7/2009 |
| JP | 2009152492 | * | 7/2009 |
| JP | 2009152492 | A | 7/2009 |
| JP | 2009227357 | A | 10/2009 |
| JP | 2015084519 | A | 4/2015 |

* cited by examiner

*Primary Examiner* — Sandra Brase
(74) *Attorney, Agent, or Firm* — ROSSI, KIMMS & McDOWELL LLP

(57) ABSTRACT

A driving control apparatus includes a movable member that can be displaced between first and second positions, a solenoid that displaces the movable member at the first position to the second position, a control unit that controls supply of current to the solenoid, and a transmission mechanism that transitions between first and second states according to a position of the movable member. The transmission mechanism transmits a driving force to a driven member in one of the first and second states. When the solenoid displaces the movable member from the first position to the second position, the current is supplied to the solenoid at a first duty cycle in a first period and is supplied to the solenoid at a second duty cycle lower than the first duty cycle in a subsequent second period.

14 Claims, 11 Drawing Sheets

227

| | REFERENCE VALUE | CORRECTION VALUE | ADJUSTMENT COEFFICIENT |
|---|---|---|---|
| FIRST DUTY CYCLE | $R_1$ | $X_1$ | α1 |
| SECOND DUTY CYCLE | $R_2$ | $X_2$ | α2 |
| THIRD DUTY CYCLE (INITIAL VALUE) | $R_{3\_1}$ | $X_3$ | α3 |
| FOURTH DUTY CYCLE (INITIAL VALUE) | $R_{4\_1}$ | $X_4$ | α4 |

DRIVING CONTROL APPARATUS AND IMAGE-FORMING APPARATUS

BACKGROUND OF THE INVENTION

Field of the Invention

The present disclosure relates to a driving control apparatus and an image-forming apparatus.

Description of the Related Art

Conventionally, in image-forming apparatuses which form images on sheets, solenoids are utilized as actuators that convert electrical energy into mechanical energy. In particular, solenoids are used in combination with some kind of driving force transmission mechanism to transmit and cut off driving forces to components such as rollers, drums and belts. Japanese Patent Laid-Open No. 2015-84519 discloses a technique in which a plunger, which is displaced by a magnetic force of a solenoid, causes an arm member to pivot and a tip of the arm member to engage with a ring gear of a planetary gear mechanism to switch between a transmission state in which a driving force is transmitted and a cut-off state in which the transmission of the driving force is cut off.

Although solenoids are convenient actuators, operation noise caused by a collision between a member moved by a magnetic force of a solenoid and another member may be unpleasant to a user. Japanese Patent Laid-Open No. 2009-149385 discloses a technique for reducing operation noise caused by a collision between a plunger and a connection member that occurs when a pickup roller is lowered toward a document. The technique disclosed in Japanese Patent Laid-Open No. 2009-149385 changes intervals of a pulse signal supplied to the solenoid such that an attraction force of the solenoid and a mechanical load are balanced to suppress a displacement speed of the plunger.

SUMMARY OF THE INVENTION

However, when a solenoid is used in combination with a driving force transmission mechanism, a load changes discontinuously at the time of transition between a transmission state in which a driving force is transmitted and a cut-off state, and so, it may not be possible to sufficiently reduce operation noise with the technique disclosed in Japanese Patent Laid-Open No. 2009-149385.

Accordingly, the present invention aims at effectively reducing operation noise in a case where a solenoid is used in combination with a driving force transmission mechanism.

According to one aspect, there is provided a driving control apparatus including a movable member that can be displaced between a first position and a second position, a solenoid configured to displace the movable member at the first position to the second position by a magnetic force, a control unit configured to control supply of current from a power source to the solenoid, and a transmission mechanism configured to transition between a first state and a second state according to a position of the movable member. The transmission mechanism transmits a driving force of a motor to a driven member in one of the first state and the second state, and does not transmit the driving force of the motor to the driven member in the other of the first state and the second state. When the solenoid displaces the movable member from the first position to the second position, the control unit is configured to, in a first period, supply current to the solenoid at a first duty cycle such that the movable member is displaced from the first position toward the second position and, in a second period which is started after the first period and before the movable member reaches the second position, supply current to the solenoid at a second duty cycle which is lower than the first duty cycle. There is also provided an image-forming apparatus including the driving control apparatus and an image-forming unit configured to form an image on a sheet.

Further features of the present invention will become apparent from the following description of exemplary embodiments (with reference to the attached drawings).

DESCRIPTION OF THE EMBODIMENTS

Figure 1A:
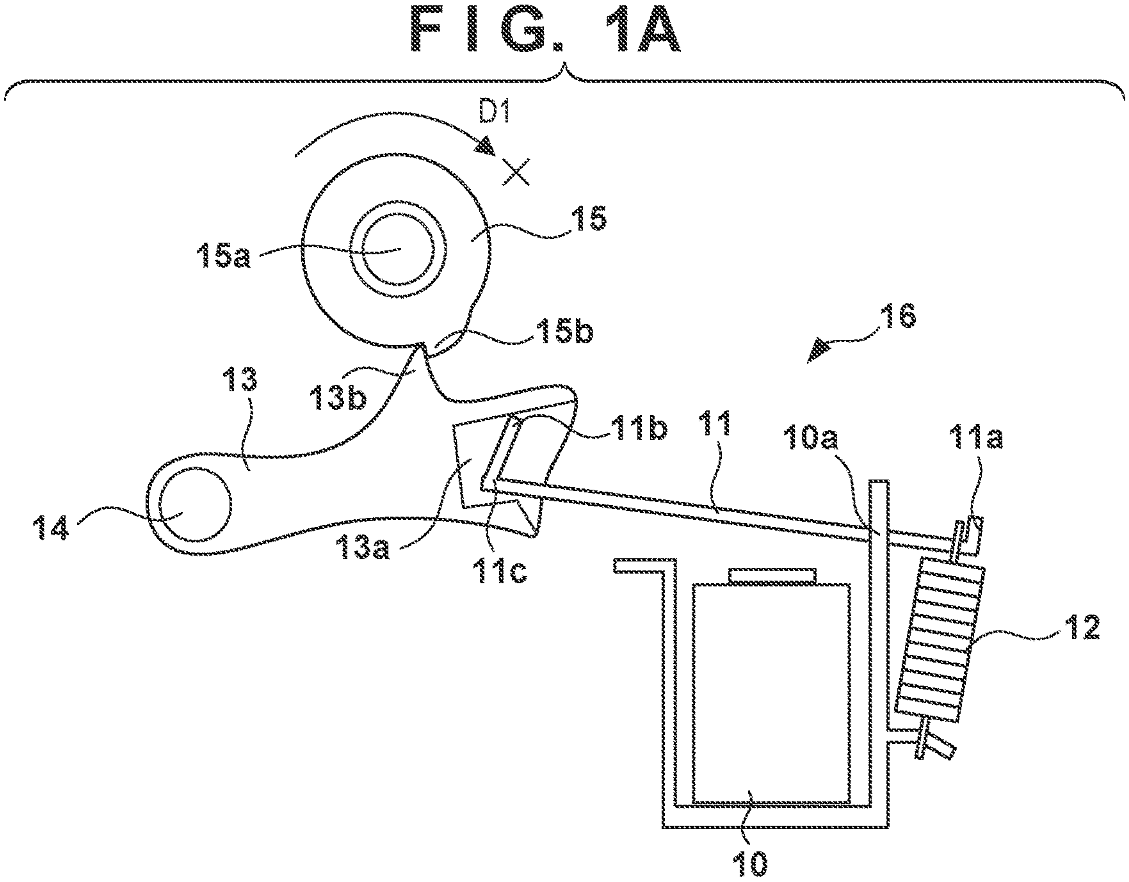
FIG. 1A is a first explanatory view regarding switching between states of a transmission mechanism in which a solenoid is used.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. SWITCHING STATES OF TRANSMISSION MECHANISM IN WHICH SOLENOID IS USED

Figure 1B:
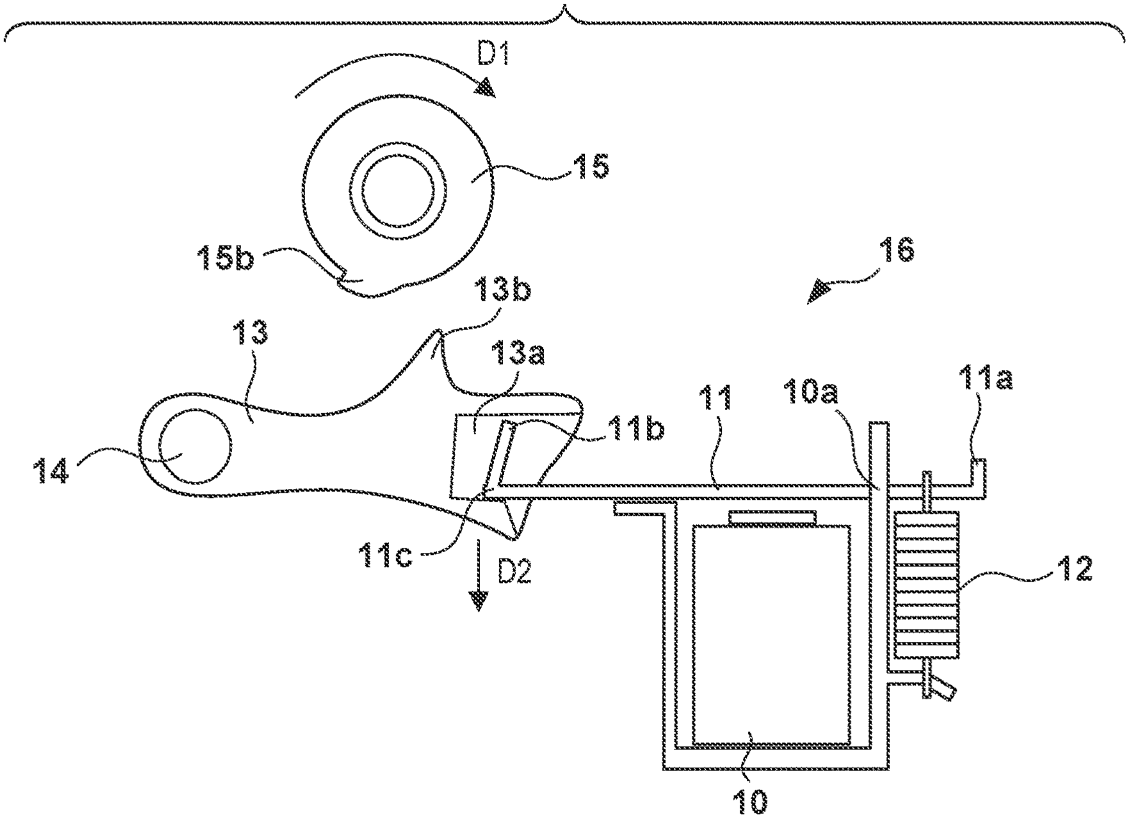
FIG. 1B is a second explanatory view regarding switching between the states of the transmission mechanism in which the solenoid is used.

FIGS. 1A and 1B are explanatory views regarding switching between states of a transmission mechanism in which a solenoid is used. In an illustrated example, a solenoid 10 generates a magnetic force by being supplied with current from a power source (not illustrated). FIG. 1A illustrates a state in which the solenoid 10 is not supplied with power, and FIG. 1B illustrates a state in which the solenoid 10 is supplied with power.

A first movable member 11 is a plate-like member pivotally supported by a fulcrum 10*a* provided in a housing of the solenoid 10 and capable of pivoting around the fulcrum 10*a*. In the drawing, a first end 11*a* of the first movable member 11 is farther to the right side than the fulcrum 10*a*, and a second end 11*b* of the first movable member 11 is farther to the left side than the fulcrum 10*a*. A cross section of the first movable member 11 is substantially square U-shaped and is bent at a bent point 11*c* separated by some distance from the second end 11*b*. The first movable member 11 is connected to an upper end of a spring 12 in a vicinity of the first end 11*a*. The spring 12 biases the first end 11*a* of the first movable member 11 downward in the drawing, and thereby, the opposite second end 11*b* of the first movable member 11 pivotally supported by the fulcrum 10*a* is biased upward in the drawing.

A second movable member (connection member) 13 is a member capable of pivoting around a pivot shaft 14. The second movable member 13 includes an opening 13*a* at an end portion opposite to the pivot shaft 14, and the opening 13*a* accommodates the second end 11*b* of the first movable member 11. Further, the second movable member 13 includes a protrusion 13*b*.

A rotary member (regulated member) 15 is a member capable of rotating around a rotary shaft 15*a* (e.g., cam). By a driving force of a motor (not illustrated) being steadily applied, for example, the rotary member 15 attempts to rotate in a clockwise direction (direction D1) in the drawing. The rotary member 15 includes a locking portion 15*b* on its periphery. In the example of FIG. 1A, the locking portion 15*b* is engaged with the protrusion 13*b* of the second movable member 13, which is at a first position. In the state of FIG. 1A, the second end 11*b* of the first movable member 11 contacts an inner surface of the opening 13*a* and biases the second movable member 13 in a direction in which it pivots counterclockwise in the drawing. Accordingly, the rotation of the rotary member 15 in the direction D1 is prevented due to the locking portion 15*b* being locked by the protrusion 13*b*.

In the example of FIG. 1B, when current is supplied to the solenoid 10, the first movable member 11 is caused to pivot counterclockwise around the fulcrum 10*a* by a magnetic force of the solenoid 10, and the bent point 11*c* of the first movable member 11 moves downward (direction D2) in the drawing. The bent point 11*c* contacts an inner surface of the opening 13*a* and causes the second movable member 13 to pivot clockwise around the pivot shaft 14. Then, the protrusion 13*b* of the second movable member 13 separates from the rotary member 15 and retracts to a second position. That is, the second movable member 13 can be displaced between the first position and the second position. The solenoid 10 displaces the second movable member 13 from the first position to the second position using a magnetic force. The first movable member 11 functions as a driving member that is connected to the second movable member 13 and is moved by a magnetic force of the solenoid 10 so as to move the second movable member 13. As a result, in the state of FIG. 1B, the rotation of the rotary member 15 is not prevented, and the rotary member 15 rotates in the direction D1 in response to a driving force of the motor.

By connecting the rotary member 15 described here directly or indirectly with some driven member, a mechanism including the rotary member 15 can be configured as a transmission mechanism that transmits a driving force from the motor to the driven member. The transmission mechanism can be switched (is capable of transitioning) between a transmission state in which a driving force is transmitted and a cut-off state in which the driving force is not transmitted by control of power supply to the solenoid 10. Further, a mechanism including the solenoid 10, the first movable member 11, and the second movable member 13 can be referred to as a switching apparatus 16, which switches the transmission mechanism between the transmission state and the cut-off state. The switching apparatus 16 may include the spring 12.

Here, in a state in which the second movable member 13 and the rotary member 15 are engaged and the protrusion 13*b* of the second movable member 13 is locking the locking portion 15*b* of the rotary member 15 as illustrated in FIG. 1A, a force such as a frictional force is generated between the second movable member 13 and the rotary member 15. Furthermore, the rotary member 15 receives a force from the motor, and so, a mechanical stress due to a force of the rotary member 15 attempting to rotate may occur between the protrusion 13*b* of the second movable member 13 and the locking portion 15*b* of the rotary member 15. Therefore, when compared to the state in which the rotary member 15 and the second movable member 13 are not engaged, a greater magnetic force of the solenoid 10 is required in order for the protrusion 13*b* of the second movable member 13 to (overcome the force and) separate from the rotary member 15 by the solenoid 10 being supplied with power. Meanwhile, when the engagement of the second movable member 13 and the rotary member 15 is once released, the magnetic force of the solenoid 10 applies a large acceleration to the second movable member 13, and since the force cancelling the acceleration is no longer present, the second movable member 13 will pivot at an excessive speed. If the second movable member 13 collides with another member, operation noise unpleasant to a user will be generated.

In the following sections, several embodiments for reducing such unpleasant operation noise will be described in detail.

2. FIRST EMBODIMENT

2-1. Overall Configuration of Apparatus

Figure 2:
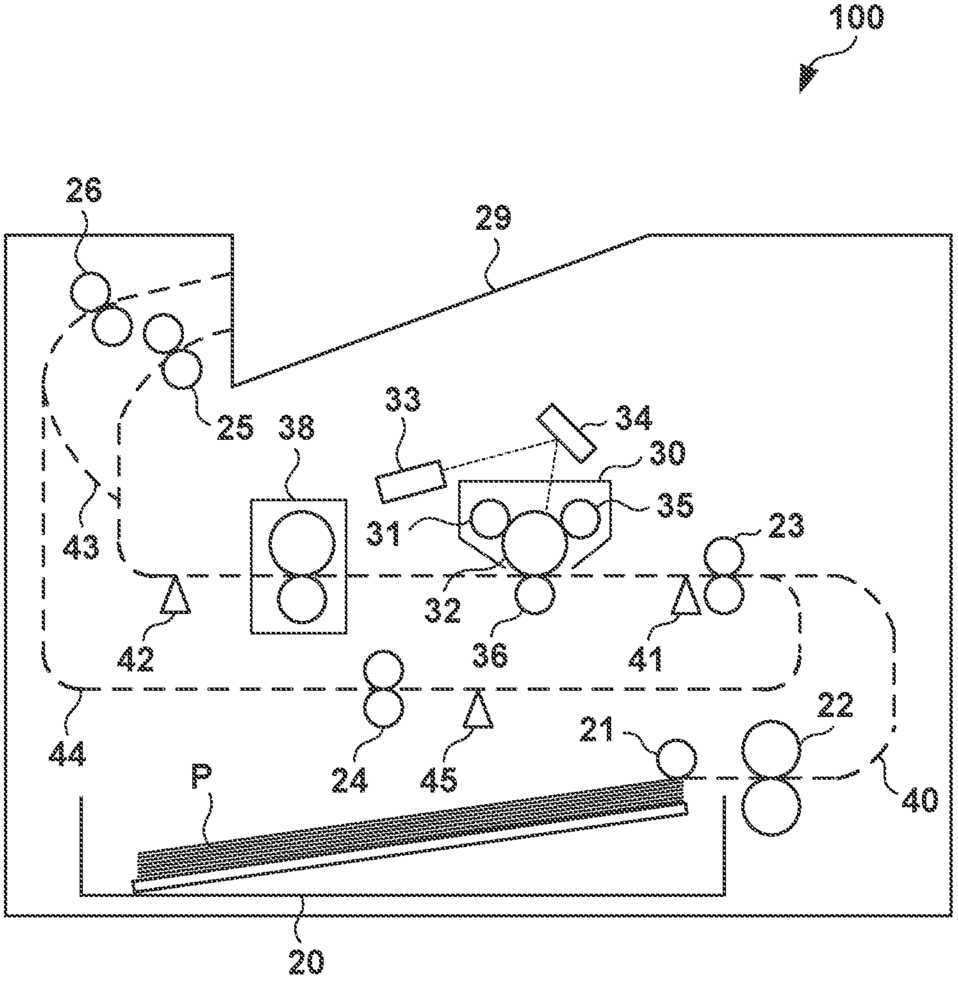
FIG. 2 is a schematic diagram illustrating an example of an overall configuration of an image-forming apparatus according to a first embodiment.

FIG. 2 is a schematic diagram illustrating an example of an overall configuration of an image-forming apparatus 100 according to a first embodiment. In the present embodiment, the image-forming apparatus 100 is a printer that forms an image on a sheet using an electrophotographic method. However, a technology according to the present disclosure is also applicable to other types of image-forming apparatuses such as a copy machine, a facsimile, and a multifunction peripheral. The technology according to the present disclosure is also applicable to an image-forming apparatus that operates using another image forming method such as an inkjet method.

A cassette 20 of the image-forming apparatus 100 accommodates a stack of sheets. A feed roller 21 picks up a sheet P from the stack of sheets in the cassette 20 and feeds the sheet P to a conveyance path 40. A separation roller pair 22 separates one sheet P from remaining sheets in order to prevent double feeding of sheets and conveys the sheet P along the conveyance path 40. A leading edge of the sheet P, which has passed through a registration roller pair 23, is detected by a sheet sensor 41.

A process cartridge 30 can be attached to and detached from the image-forming apparatus 100 as an integrated unit including a charge roller 31, a photosensitive drum 32, a developing roller 35, and a toner storage unit (not illustrated). The process cartridge 30 may be considered to be an image-forming unit that forms an image on a sheet. The process cartridge 30 starts execution of an image forming process based on a timing at which the leading edge of the sheet P is detected by the sheet sensor 41. First, the charge roller 31 uniformly charges a surface of the photosensitive drum 32, which rotates clockwise in the drawing. An exposure device 33 emits a laser beam according to input image data of a print job. A laser mirror 34 reflects the laser beam from the exposure device 33 and exposes the surface of the photosensitive drum 32 to the laser beam. As a result, an electrostatic latent image is formed on the surface of the photosensitive drum 32. The developing roller 35 develops the electrostatic latent image on the surface of the photosensitive drum 32 by supplying toner to the photosensitive drum 32 and forms a toner image. The photosensitive drum 32 further rotates while carrying the toner image and cooperates with a transfer roller 36 to transfer the toner image onto the sheet P, which has reached a transfer position.

A fixing device 38 fixes the toner image onto the sheet P, which has passed through the transfer position, by pressing and heating the sheet P. In a case of single-sided print mode, the sheet P is discharged to a discharge tray 29 by a discharge roller pair 25. In a case of double-sided print mode, the sheet P is sent to a reverse path 43 by a flapper (not illustrated). A conveyance direction of the sheet P is reversed based on a timing at which a sheet sensor 42 detects a trailing edge of the sheet P. A reverse roller pair 26 sends the sheet P to a double-sided conveyance path 44. A sheet sensor 45 detects the sheet P after it has entered the double-sided conveyance path 44. A double-sided conveyance roller pair 24 is disposed on the double-sided conveyance path 44. The double-sided conveyance roller pair 24 conveys the sheet in the double-sided print mode and sends the sheet P from the double-sided conveyance path 44 to the conveyance path 40 in a state in which front and back have been reversed. The double-sided conveyance roller pair 24 does not convey the sheet in the single-sided print mode. The photosensitive drum 32 cooperates with the transfer roller 36 to transfer the toner image for a back surface onto the sheet P after it has reached the transfer position again. Furthermore, the sheet P, after it has passed through the fixing device 38 and double-sided printing thereon has been completed, is discharged to the discharge tray 29 by the discharge roller pair 25.

Each roller included in the configuration of the image-forming apparatus 100 described above is a driven member that operates in response to the driving force of the motor. As will be described below, the image-forming apparatus 100 includes a transmission mechanism that transmits the driving force of the motor to at least one driven member. The states of the transmission mechanism can be switched between the transmission state in which the driving force is transmitted to the driven member and the cut-off state in which the driving force is not transmitted to the driven member. The states of the transmission mechanism are switched by controlling the magnetic force of the solenoid.

For example, the double-sided conveyance roller pair 24 is mechanically connected to the motor via a transmission mechanism 140 (see FIGS. 3 and 4), which will be described below. The transmission mechanism 140 is maintained in the cut-off state by current being steadily supplied to the solenoid. In the double-sided print mode, when a timing at which to return the sheet P to the conveyance path 40 arrives, the supply of current to the solenoid is interrupted, and the state of the transmission mechanism 140 transitions to the transmission state. As a result, the double-sided conveyance roller pair 24 starts to rotate, and the sheet P is sent from the double-sided conveyance path 44 to the conveyance path 40. When the sheet sensor 45 detects the trailing edge of the sheet P, the supply of current to the solenoid is resumed, the state of the transmission mechanism 140 transitions to the cut-off state, and the double-sided conveyance roller pair 24 stops rotating. A timing at which the double-sided conveyance roller pair 24 sends the sheet P to the conveyance path 40 may be determined, for example, such that a sufficient space with a subsequent sheet is ensured. Naturally, other rollers described with reference to FIG. 1 may also receive the driving force from the motor via the same transmission mechanism 140 or another transmission mechanism.

2-2. Configuration of Control Function

Figure 3:
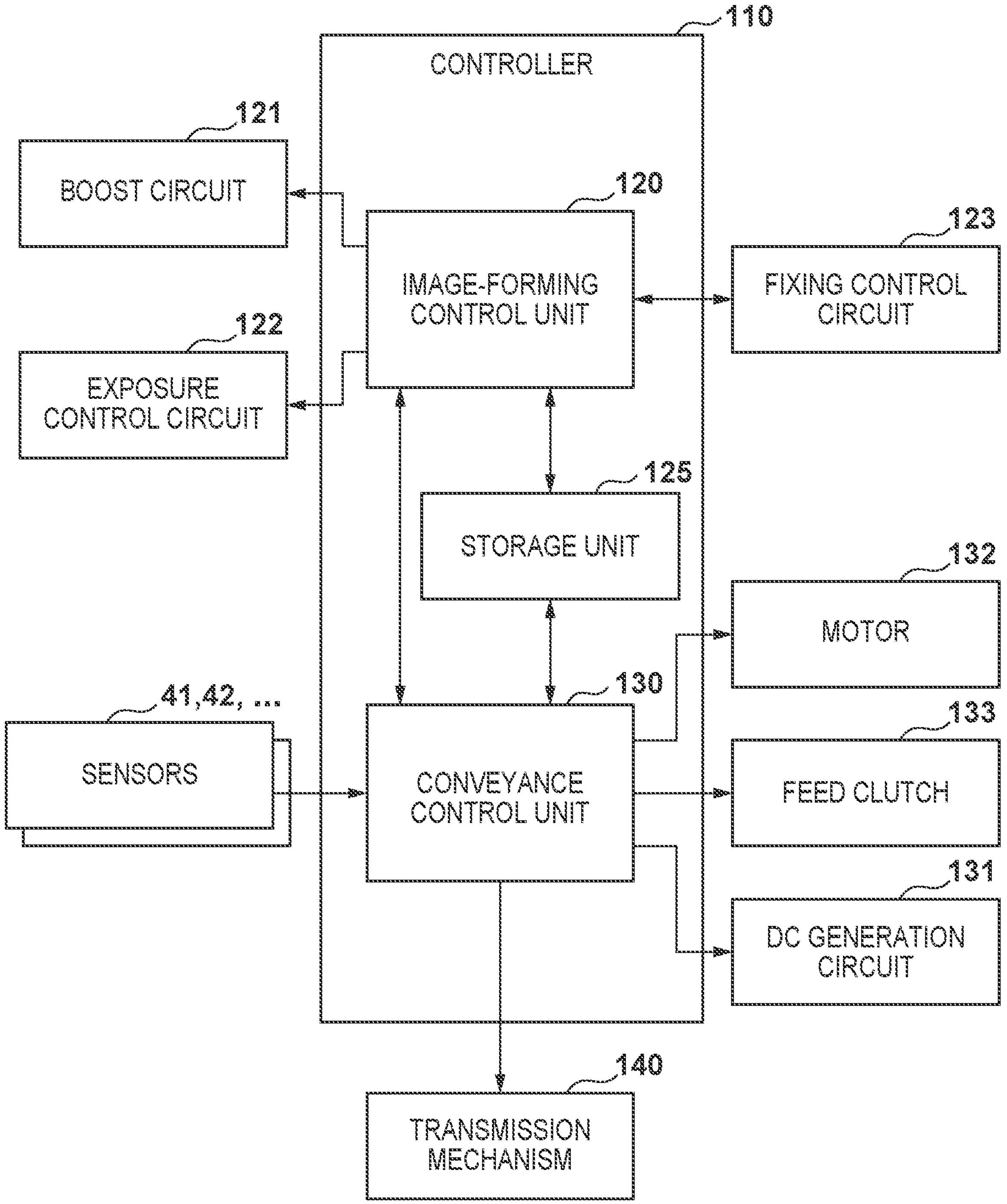
FIG. 3 is a block diagram illustrating an example of a configuration of a control function of the image-forming apparatus according to the first embodiment.

FIG. 3 is a block diagram illustrating an example of a configuration of a control function of the image-forming apparatus 100. A controller 110 illustrated in FIG. 3 is a driving control unit that controls driving of various members of the image-forming apparatus 100. For example, the controller 110 may include a general-purpose processing circuit, such as a microprocessor or a microcontroller. The controller 110 may also include a dedicated processing circuit, such as an ASIC or an FPGA. A control function to be described below may be implemented by any combination of software, firmware, and hardware. Referring to FIG. 3, the controller 110 includes an image-forming control unit 120, a storage unit 125, and a conveyance control unit 130.

The image-forming control unit 120 is a control unit that is connected to a boost circuit 121, an exposure control circuit 122, and a fixing control circuit 123. The boost circuit 121 boosts a voltage of a power source (not illustrated) and outputs, to the charge roller 31, the developing roller 35, and the transfer roller 36, high voltages for charging the photosensitive drum 32, for developing the electrostatic latent image, and for transferring the toner image, respectively. The exposure control circuit 122 controls on/off of the laser beam emitted from the exposure device 33 and scanning of the laser beam on the surface of the photosensitive drum 32 by the laser mirror 34. The fixing control circuit 123 controls the pressing and heating of the sheet P by the fixing device 38. The fixing control circuit 123 may be connected to a thermistor (not illustrated) that detects a temperature of a heater of the fixing device 38.

The storage unit 125 is a storage unit including any combination of a random access memory (RAM), a read-only memory (ROM) and a hard disk drive (HDD). The RAM is an example of a transitory computer-readable storage medium. The ROM and the hard disk are examples of a non-transitory computer-readable storage medium. The storage unit 125 stores one or more control programs and various kinds of data (e.g., setting data and image data).

The controller 110, more specifically the conveyance control unit 130, is a control unit that is connected to the sensors 41, 42, . . . , a direct current (DC) generation circuit 131, a motor 132, a feed clutch 133, and the transmission mechanism 140. The DC generation circuit 131 generates a low-voltage DC power source, which is a supply source of direct current to several actuators such as a solenoid to be described below. The motor 132 generates a driving force that drives a plurality of driven members included in the image-forming apparatus 100. The feed clutch 133 transmits the driving force from the motor 132 to the feed roller 21 or cuts off the transmission of the driving force to the feed roller 21. The transmission mechanism 140 transmits the driving force from the motor 132 to the double-sided conveyance roller pair 24 in a first state and cuts off the transmission of the driving force to the double-sided conveyance roller pair 24 in a second state. As will be described in the next section, the state of the transmission mechanism 140 transitions according to a position of a movable member that can be displaced by a magnetic force of a solenoid. Note that the feed clutch 133 may also have a configuration similar to that of the transmission mechanism 140.

2-3. Example of Configuration of Transmission Mechanism

Figure 4:
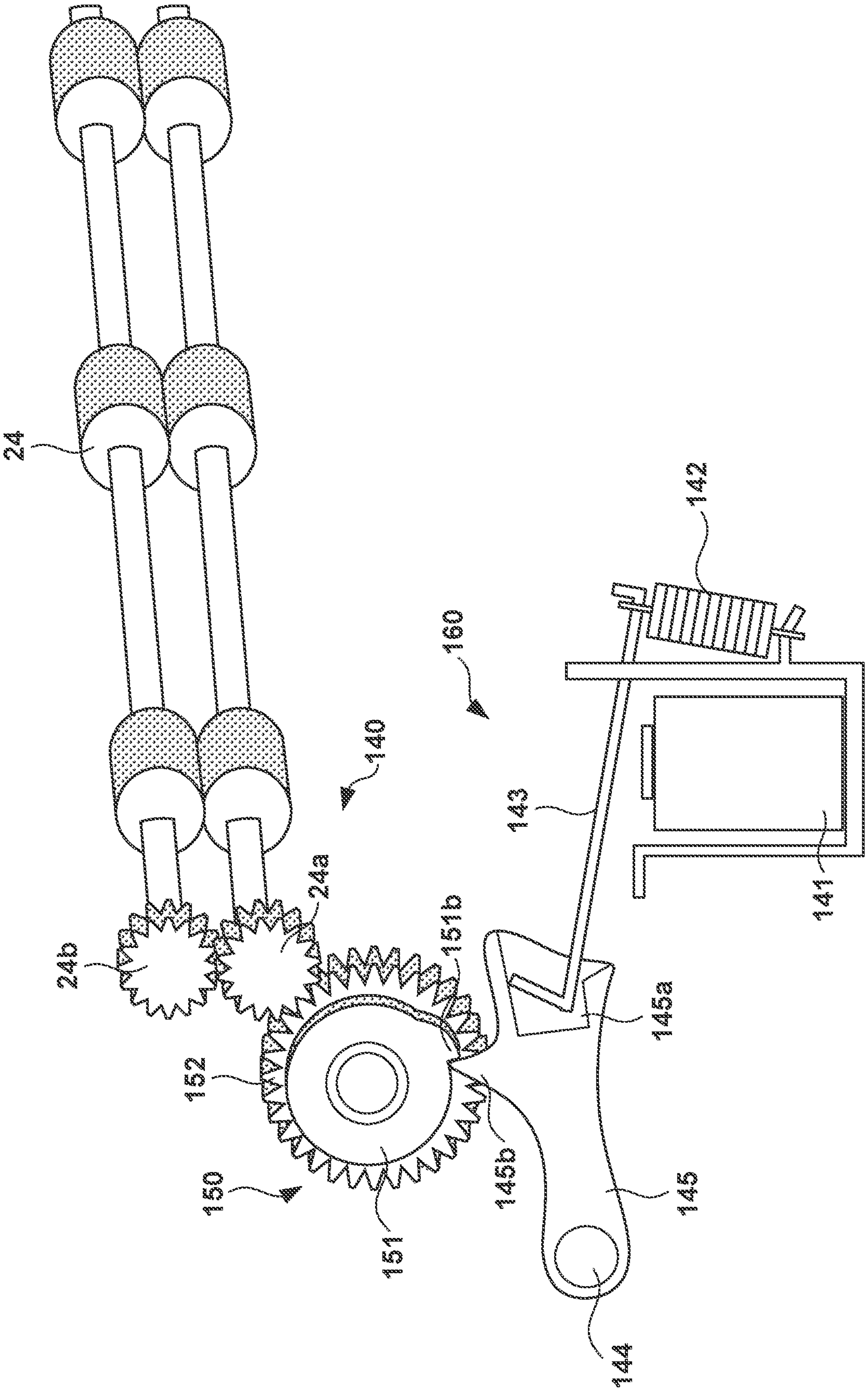
FIG. 4 is a schematic diagram for explaining an example of a configuration of a transmission mechanism and a switching apparatus.

FIG. 4 is a schematic diagram for explaining an example of a configuration of the transmission mechanism 140 and a switching apparatus 160. In the example of FIG. 4, the transmission mechanism 140 includes a planetary gear mechanism 150. The transmission mechanism 140 may include a first gear 24*a* and a second gear 24*b*. The switching apparatus 160 includes a solenoid 141, a first movable member 143, and a second movable member 145. The switching apparatus 160 may include a spring 142. FIG. 4 illustrates a state in which the solenoid 141 is not supplied with power. The transmission mechanism 140 and the switching apparatus 160 illustrated in FIG. 4 may have configurations similar to those of the transmission mechanism and the switching apparatus 16 illustrated in FIGS. 1A and 1B.

The first movable member (driving member) 143 is a plate-like member pivotally supported by a housing of the solenoid 141 and capable of pivoting. The first movable member 143 corresponds to the first movable member 11 in FIGS. 1A and 1B. The solenoid 141 corresponds to the solenoid 10 in FIGS. 1A and 1B. The first movable member 143 is connected to an upper end of the spring 142 in a vicinity of one end. The spring 142 biases the one end of the first movable member 143 downward in the drawing. Thereby, the other end of the first movable member 143 is biased upward in the drawing. The second movable member 145 is a member capable of pivoting around a pivot shaft 144. The second movable member (movable member) 145 corresponds to the second movable member 13 in FIGS. 1A and 1B. The second movable member 145 includes an opening 145*a* at an end portion on a side opposite to the pivot shaft 144. By the opening 145*a* accommodating the above other end of the first movable member 143, the first movable member 143 and the second movable member 145 are connected to each other in a form in which both are capable of pivoting in coordination. In the present embodiment, as will be described below, by the first movable member 143 being moved by a magnetic force of the solenoid 141, the second movable member 145 is displaced between the first position and the second position. The second movable member 145 includes a protrusion 145*b*. It can be said that the switching apparatus 160 includes a stopper portion including the first movable member 143 and the second movable member 145. A state in which the second movable member 145 is at the first position and is engaged with a cam 151 can be referred to as a restricted state of the stopper portion. A state in which the second movable member 145 is at the second position and is separated from the cam 151 can be referred to as a released state of the stopper portion. That is, the stopper portion can assume the restricted state (engaged state) in which it is engaged with the cam 151 and the released state (separated state) in which it is separated from the cam 151. The restricted state and the released state of the stopper portion are switched by a change in the supply of current to the solenoid 141.

The planetary gear mechanism 150 is typically constituted by a sun gear, planet gears, a planet carrier, and a ring gear, but only a portion of that configuration is illustrated in a simplified manner in FIG. 4.

In the present embodiment, the cam 151 (regulated member) is connected to the sun gear of the planetary gear mechanism 150. The cam 151 corresponds to the rotary member 15 in FIGS. 1A and 1B. The cam 151 includes a locking portion 151*b* on its periphery. The locking portion 151*b* is engaged with the protrusion 145*b* of the second movable member 145, which is at the first position, illustrated in FIG. 4. In this state, the rotation of the sun gear is prevented. An output gear 152 is connected with the planet carrier of the planetary gear mechanism 150. The ring gear of the planetary gear mechanism 150 steadily rotates counterclockwise in the drawing in response to the driving force of the motor 132. When the rotation of the sun gear is prevented, the planet gears of the planetary gear mechanism 150 orbit counterclockwise around the sun gear in coordination with the rotation of the ring gear and rotate the planet carrier counterclockwise around a rotary shaft together with the output gear 152. The output gear 152 is engaged with the first gear 24*a* of the double-sided conveyance roller pair 24, and the first gear 24*a* is engaged with the second gear 24*b*. When the output gear 152 is rotated, the first gear 24*a* and the second gear 24*b* are rotated in coordination (but in opposite directions from each other), and the pair 24 of the double-sided conveyance rollers on the same shafts as the first gear 24*a* and the second gear 24*b* are rotated. At this time, when the sheet P reaches the double-sided conveyance roller pair 24, the sheet P is conveyed from the left side to the right side in the drawing by the rotation of the double-sided conveyance roller pair 24.

Meanwhile, when current is supplied to the solenoid 141, the first movable member 143 is caused to pivot counterclockwise by the magnetic force of the solenoid 141, and a left end of the first movable member 143 presses down the second movable member 145 in the opening 145*a* and causes the second movable member 145 to pivot clockwise. Then, the protrusion 145*b* of the second movable member 145, which has been preventing the sun gear from rotating by locking the locking portion 151*b* of the cam 151 at the first position, is separated from the cam 151 and is displaced to the second position. In this state, the sun gear and the cam 151 can rotate. If the rotation of the sun gear is not prevented (sun gear is not receiving a load), the planet gears each spin without orbiting around the sun gear (sun gear idles in coordination therewith). Accordingly, the planet carrier does not rotate, and so, the output gear 152, the first gear 24*a*, and the second gear 24*b* also do not rotate, and the transmission of the driving force from the motor 132 to the double-sided conveyance roller pair 24 is cut off. Note that the configuration of the planetary gear mechanism 150 is not limited to this configuration. It need only be that one of the sun gear, the planet gears, and the planet carrier is connected to the cam 151, one of the other two is driven by the motor 132, and the last one is connected to the output gear 152.

When the supply of current to the solenoid 141 is stopped again, the first movable member 143 is caused to pivot clockwise by an elastic force of the spring 142 and causes the second movable member 145 to pivot counterclockwise around the pivot shaft 144. Then, the protrusion 145*b* of the second movable member 145 returns from the second position to the first position and locks the locking portion 151*b* of the cam 151. Thereby, the transmission of the driving force from the motor 132 to the double-sided conveyance roller pair 24 is resumed, and the double-sided conveyance roller pair 24 rotates.

Here, an example in which, among the first state in which a locking portion of the transmission mechanism is engaged with the movable member and the second state in which the locking portion of the transmission mechanism is not engaged with the movable member, the transmission mechanism transmits the driving force of the motor to the driven member in the first state has been described. The driven member may be, for example, a roller involved in conveying a sheet. However, the technology according to the present disclosure is not limited to such an example. Contrary to the example described above, the transmission mechanism may, in the first state, not transmit the driving force of the motor to the driven member and, in the second state, transmit the driving force of the motor to the driven member. For example, by adopting a configuration in which the movable member, which is biased to the first position, locks a locking portion of a rotary body capable of rotating in coordination with an output gear, it is possible to prevent the rotation of the output gear in the first state and cut off the transmission of the driving force of the motor to the driven member.

It should be noted that any number of members coordinated with each other may be interposed between the movable member on which the magnetic force of the solenoid directly acts and the movable member that engages with the regulated member. Further, the movable member itself on which the magnetic force of the solenoid directly acts may be engaged with the regulated member. For example, a protrusion that engages with the locking portion 151*b* of the cam 151 may be provided at one end of the first movable member 143 described with reference to FIG. 4.

2-4. Power Supply Control of Solenoid

The driving force of the motor 132 is applied to the transmission mechanism 140 described in the previous section in both the first state in which the second movable member 145 is at the first position and the second state in which the second movable member 145 is at the second position. The conveyance control unit 130 is configured to control the supply of current to the solenoid 141. For example, when cutting off the transmission of the driving force to the double-sided conveyance roller pair 24, the conveyance control unit 130 displaces the second movable member 145 from the first position to the second position by supplying current from the DC generation circuit 131 to the solenoid 141. At this time, the conveyance control unit 130 changes a supply amount of current to the solenoid 141 over time in order to reduce a pivot speed of the second movable member 145 after the second movable member 145 has been separated from the planetary gear mechanism 150. Here, although not limited thereto, assume that a change in the supply amount of current is realized by a pulse modulation method (e.g., pulse amplitude modulation or pulse width modulation). That is, the conveyance control unit 130 increases or decreases the magnetic force of the solenoid 141 by changing a duty cycle of power supply to the solenoid 141 and thereby controls the movement of the movable member.

Figure 5:
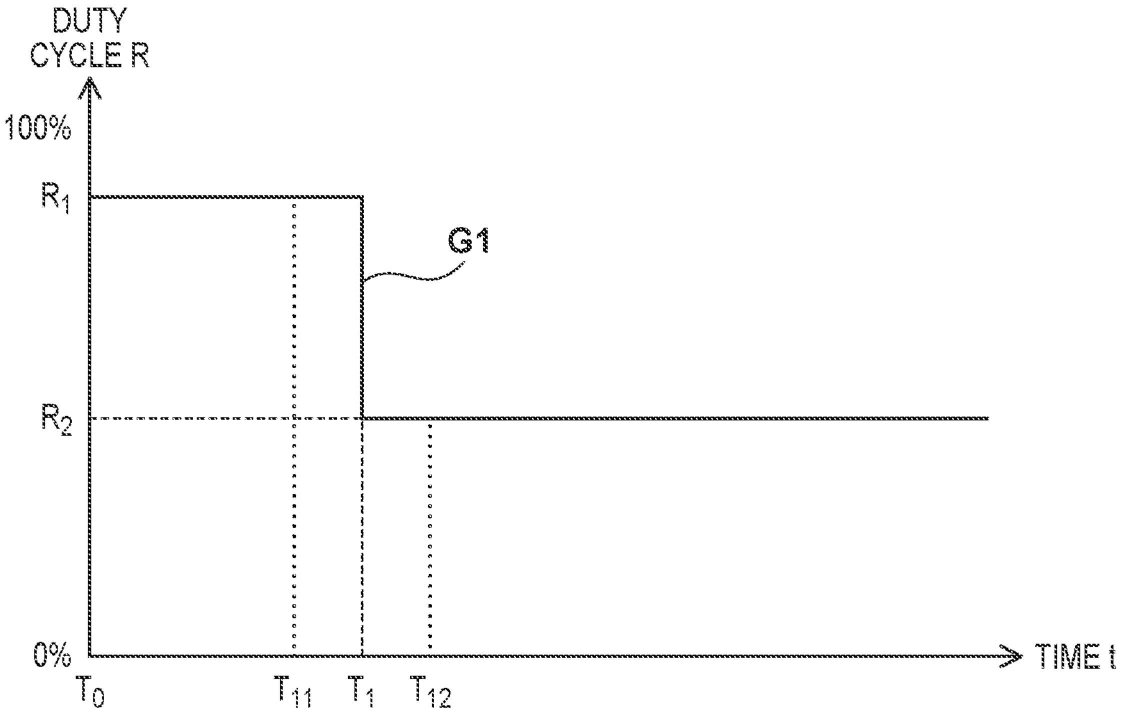
FIG. 5 is a graph representing an example of a change over time in a duty cycle of power supply to the solenoid according to the first embodiment.

FIG. 5 illustrates a graph representing an example of a change in the duty cycle of power supply to the solenoid 141 over time. A horizontal axis of a graph G1 of FIG. 5 represents an elapse of time, and a vertical axis represents the duty cycle of power supply to the solenoid 141 in percentage.

A time $T_0$ is a timing at which power supply to the solenoid 141 is started. In a first period from the time $T_0$ to a time $T_1$, the conveyance control unit 130 supplies current to the solenoid 141 from the DC generation circuit 131 at a first duty cycle $R_1$. Next, in a second period after the first period, the conveyance control unit 130 supplies current to the solenoid 141 from the DC generation circuit 131 at a second duty cycle $R_2$, which is lower than the first duty cycle $R_1$. The second period continues until power supply from the DC generation circuit 131 to the solenoid 141 is stopped in order to resume the transmission of the driving force to the double-sided conveyance roller pair 24. During the first period, the engagement of the second movable member 145 and the cam 151 is released, and the protrusion 145*b* of the second movable member 145 is separated from the locking portion 151*b*. The first period ends before the second movable member reaches the second position, and the second period is started after the end of the first period and before the second movable member reaches the second position. In other words, a length of the first period is shorter than a time it takes for the second movable member 145 to move from the first position to the second position. That is, current is supplied to the solenoid 141 at the first duty cycle $R_1$ such that the second movable member 145 starts to be displaced from the first position toward the second position. Then, after the engagement of the second movable member 145 and the cam 151 has been released, before the second movable member 145 reaches the second position, current is supplied to the solenoid 141 at the second duty cycle $R_2$.

The first duty cycle $R_1$ corresponds to a strength of the magnetic force of the solenoid 141 that is sufficient to overcome the driving force of the motor 132 and separate the protrusion 145*b* of the second movable member 145 from the locking portion 151*b*. The first duty cycle $R_1$ may be determined in advance in view of a load of the cam 151 and friction of an engaging surface of the locking portion 151*b* which are dependent on the driving force of the motor 132, mechanical and electrical variations, characteristics of the solenoid 141, effects of an increase in temperature, and the like. The length of the first period may be determined in advance so as to be long enough for the protrusion 145*b* of the second movable member 145 to separate from the locking portion 151*b* and shorter than a length of time until the second movable member 145 (and the first movable member 143 that moves in coordination) collides with another member. That is, when current is supplied to the solenoid 141 at the first duty cycle $R_1$ in a state in which the second movable member 145 and the cam 151 are engaged (state in which the protrusion 145*b* and the locking portion 151*b* are engaged), it is possible for the second movable member 145 to start to be displaced from the first position toward the second position. In other words, in this case, a force received by the second movable member 145 is greater than a minimum force necessary for the second movable member 145 to move from the first position to the second position. The second duty cycle $R_2$ corresponds to a strength of the magnetic force of the solenoid 141 necessary for displacing the second movable member 145 separated from the locking portion 151*b* toward the second position. That is, the second duty cycle $R_2$ corresponds to a strength of the magnetic force of the solenoid 141 at which it is possible to displace the second movable member 145 toward the second position in a state in which the engagement of the locking portion 151*b* and the second movable member 145 has been released. The second duty cycle $R_2$ may be determined in advance to be a sufficiently low value within a range in which it is possible to reliably displace the second movable member 145 toward the second position against the elastic force of the spring 142 in view of mechanical and electrical variations. In the second period, the load of the cam 151 is not applied to the second movable member 145, and so, it is possible to set the second duty cycle $R_2$ to be significantly lower than the first duty cycle $R_1$. Note that, when current is supplied to the solenoid 141 at the second duty cycle $R_2$ in a state in which the second movable member 145 and the cam 151 are engaged, the engagement of the second movable member 145 and the cam 151 is maintained. In other words, when current is supplied to the solenoid 141 at the second duty cycle $R_2$ in a state in which the second movable member 145 and the cam 151 are engaged, a force received by the second movable member 145 due to the magnetic force of the solenoid 141 is smaller than a force necessary for the second movable member 145 to start to be displaced from the first position toward the second position. The storage unit 125 of the controller 110 stores in advance setting data indicating setting values such as the first duty cycle $R_1$, the second duty cycle $R_2$, and the length of the first period thus determined.

Figure 6A:
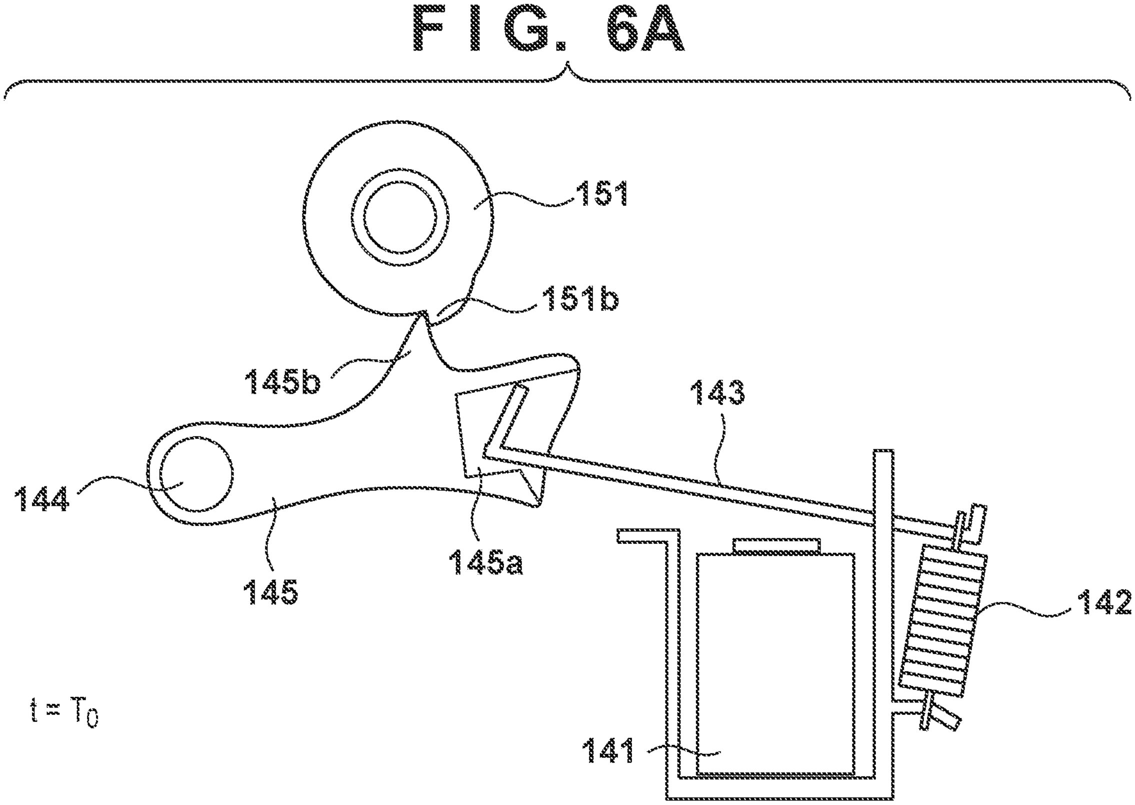
FIG. 6A is an explanatory view illustrating a positional relationship between a movable member, which is at a first position, and the transmission mechanism.

FIG. 6A illustrates a positional relationship between the second movable member 145 and the cam 151 at the time $T_0$ at which power supply to the solenoid 141 is started. At the time $T_0$, the second movable member 145 is at the first position, and the locking portion 151*b* of the second movable member 145 is engaged with the protrusion 145*b* of the cam 151.

Figure 6B:
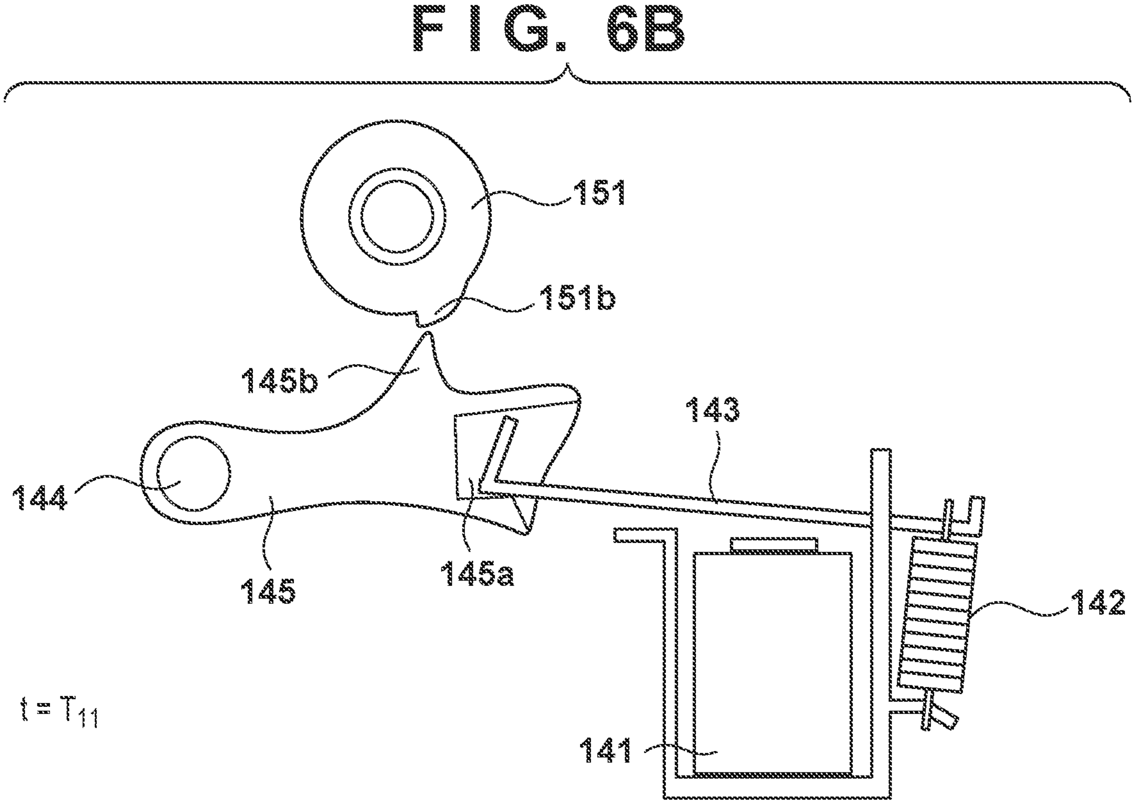
FIG. 6B is an explanatory view illustrating a positional relationship between the movable member just before the duty cycle is decreased and the transmission mechanism.

FIG. 6B illustrates a positional relationship between the second movable member 145 and the cam 151 at a time $T_{11}$ just before the first period ends. At the time $T_{11}$, the second movable member 145 is halfway between the first position and the second position, and the locking portion 151*b* of the second movable member 145 has just separated from the protrusion 145*b* of the cam 151. At this point in time, the cam 151 is not locked by the second movable member 145 and can rotate. Current is still supplied to the solenoid 141 at the first duty cycle $R_1$ and a strong magnetic force of the solenoid 141 acts on the first movable member 143, but when the immediately succeeding time $T_1$ arrives, the duty cycle is decreased to the second duty cycle $R_2$.

Figure 6C:
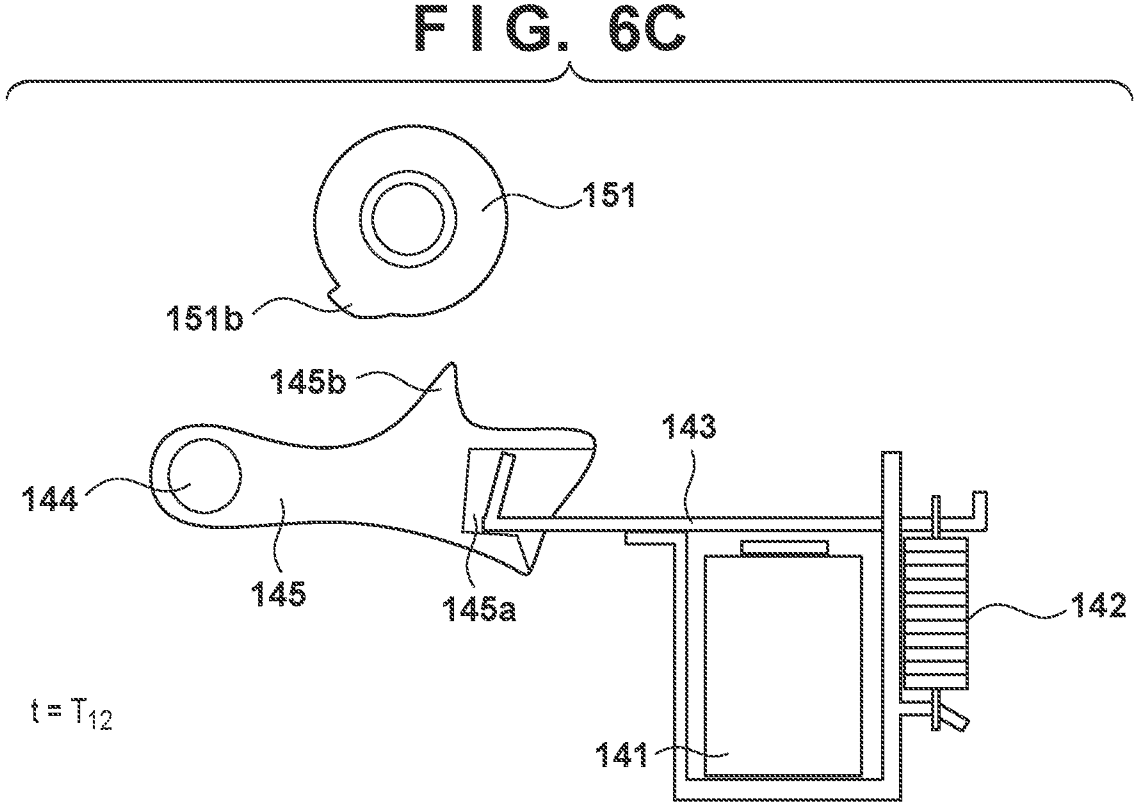
FIG. 6C is an explanatory view illustrating a positional relationship between the movable member that has reached a second position and the transmission mechanism.

FIG. 6C illustrates a positional relationship between the second movable member 145 and the cam 151 at a time $T_{12}$ in the middle of the second period. At the time $T_{12}$, the second movable member 145 reaches the second position. Meanwhile, the first movable member 143 is contacting the housing of the solenoid 141, and movement is restricted. The housing of the solenoid 141 functions as a restriction unit for restricting the movement of the first movable member 143. Note that the movement of the first movable member 143 may alternatively be restricted by a component different from the housing of the solenoid 141. The cam 151 is rotating from the time $T_{11}$ to the time $T_{12}$. In the second period, current is supplied to the solenoid 141 at the second duty cycle $R_2$, which is lower than the first duty cycle $R_1$, and so, a magnetic force of the solenoid 141 lower than that of the first period acts on the first movable member 143. By the time the second movable member 145 reaches the second position, pivot speeds of the first movable member 143 and the second movable member 145 will be reduced. The first movable member 143 stops, for example, by colliding with the housing of the solenoid 141, and the second movable member 145 also stops.

2-5. Example of Flow of Processing

Figure 7:
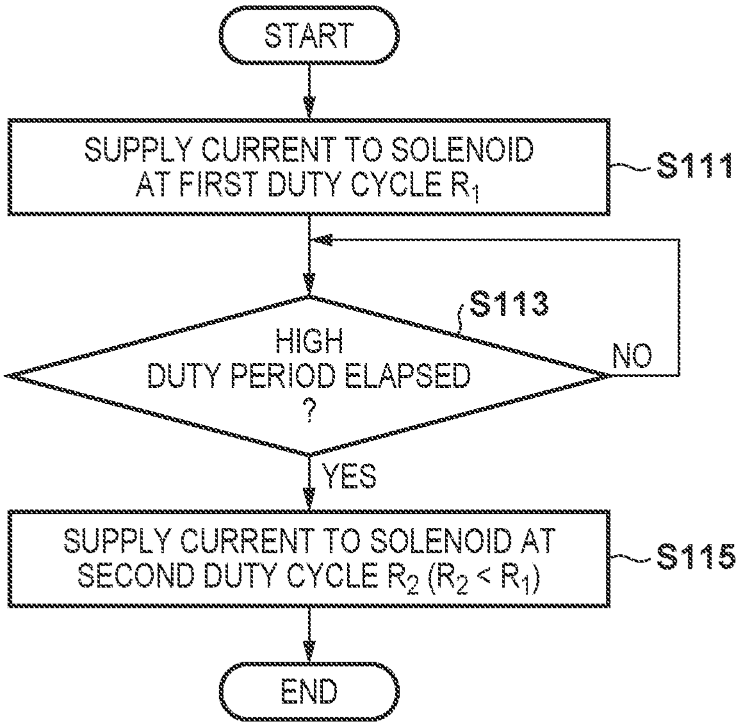
FIG. 7 is a flowchart illustrating an example of a flow of driving control processing according to the first embodiment.

FIG. 7 is a flowchart for explaining an example of a flow of driving control processing which may be executed by the conveyance control unit 130 according to the present embodiment. The driving control processing illustrated in FIG. 7 may be realized, for example, by the processing circuit of the controller 110 executing a computer program stored in advance in the storage unit 125.

First, when a timing at which to stop the driven member operating in response to the driving force of the motor 132 arrives, in step S111 the conveyance control unit 130 starts power supply to the solenoid 141 at the first duty cycle $R_1$. In step S113, the conveyance control unit 130 monitors a timer and waits for the first period (also referred to as a high duty period) to elapse while continuing power supply at the first duty cycle $R_1$. When the first period elapses, in step S115 the conveyance control unit 130 decreases the duty cycle of power supply to the solenoid 141 from the first duty cycle $R_1$ to the second duty cycle $R_2$.

2-6. Summary of First Embodiment

In the first embodiment described in this section, in order to separate the movable member locking the transmission mechanism for transmitting the driving force of the motor to the driven member from the transmission mechanism, power supply to the solenoid is controlled so as to displace the movable member from the first position to the second position by the magnetic force of the solenoid. Specifically, in the first period, current is supplied from the power source to the solenoid at the first duty cycle, and in the second period after the first period, current is supplied from the power source to the solenoid at the second duty cycle lower than the first duty cycle. Thereby, in the first period which is at the beginning of power supply control, by using a sufficiently high first duty cycle, it is possible to reliably separate the movable member from the transmission mechanism to which the driving force of the motor is being steadily applied. In addition, in the second period after the first period, by reducing the speed of the movable member which is free from the load before reaching the second position, it is possible to reduce operation noise caused by a collision between the movable member and another member. That is, it is possible to achieve both reliable separation of the movable member and reduction of operation noise uncomfortable to the user.

It should be noted that, though a configuration of a flapper-type solenoid is mainly described in the present embodiment, the technology according to the present disclosure is also applicable to other types of solenoids (e.g., plunger-type solenoid). Further, the driven member is not limited to a roller involved in conveyance of a sheet. For example, the technology according to the present disclosure may be utilized for transmission and cutting off of the driving force to and from members involved in formation of an electrostatic latent image or a toner image, such as the charge roller 31, the photosensitive drum 32, the laser mirror 34, the developing roller 35, and the transfer roller 36.

Further, the transition of the duty cycle illustrated in FIG. 5 is only an example. For example, after the end of the first period, the duty cycle may be decreased in multiple steps, such as further decreasing the duty cycle from the second duty cycle to a third duty cycle.

3. SECOND EMBODIMENT

The smaller the duty cycle of power supply of the solenoid described above is, the more reduced the speed of the movable member may be, but a margin is necessary to ensure proper operation of the driven member against uncertain factors, such as mechanical and electrical variations and effects of an increase in temperature. A magnitude of a margin of the duty cycle and a magnitude of operation noise caused by a collision between members have a trade-off relationship. In a second embodiment to be described in this section, repetition of a high duty period and a low duty period is introduced to control of the duty cycle over time to reduce the margin of the duty cycle and further reduce operation noise.

A configuration of the transmission mechanism, a configuration of the control function, and an overall configuration of the image-forming apparatus 100 according to the second embodiment may be similar to those of the first embodiment. Also in the second embodiment, the driving force of the motor 132 is transmitted to the double-sided conveyance roller pair 24 by the second movable member 145, which is at the first position, preventing the rotation of the cam 151 of the transmission mechanism 140. When cutting off the transmission of the driving force to the double-sided conveyance roller pair 24, the conveyance control unit 130 displaces the second movable member 145 from the first position to the second position by supplying current from the DC generation circuit 131 to the solenoid 141. Also in the present embodiment, assume that the conveyance control unit 130 controls the movement of the first movable member 143 and the second movable member 145 (coordinated with the first movable member 143) by changing the duty cycle of power supply to the solenoid 141 over time.

3-1. Power Supply Control of Solenoid

Specifically, in the present embodiment, when displacing the second movable member 145 from the first position to the second position, the conveyance control unit 130 alternately repeats the high duty period and the low duty period a plurality of times. The conveyance control unit 130 increases at least a duty cycle in the high duty period for each repetition. The high duty period and the low duty period in the last repetition may be similar to the first period and the second period, respectively, in the first embodiment. In the following description, the high duty period and the low duty period excluding the last repetition are referred to as a third period and a fourth period, respectively.

When the number of repetitions is set to once for descriptive simplicity, a control sequence is constituted by the following four types of duty periods in chronological order.

- Third period: power supply to the solenoid is performed at a third duty cycle $R_3$. The third duty cycle $R_3$ is lower than the first duty cycle $R_1$ and higher than the second duty cycle $R_2$;
- Fourth period: power supply to the solenoid is performed at a fourth duty cycle $R_4$. The fourth duty cycle $R_4$ is lower than the third duty cycle $R_3$. The fourth duty cycle $R_4$ corresponds to a strength of the magnetic force of the solenoid for displacing the movable member separated from the transmission mechanism toward the second position;
- First period: power supply to the solenoid is performed at the first duty cycle $R_1$. The first duty cycle $R_1$ corresponds to a strength of the magnetic force of the solenoid for overcoming the driving force of the motor and separating the movable member from the transmission mechanism and includes a sufficient margin;
- Second period: power supply to the solenoid is performed at the second duty cycle $R_2$. The second duty cycle $R_2$ corresponds to a strength of the magnetic force of the solenoid for displacing the movable member separated from the transmission mechanism toward the second position.

Figure 8:
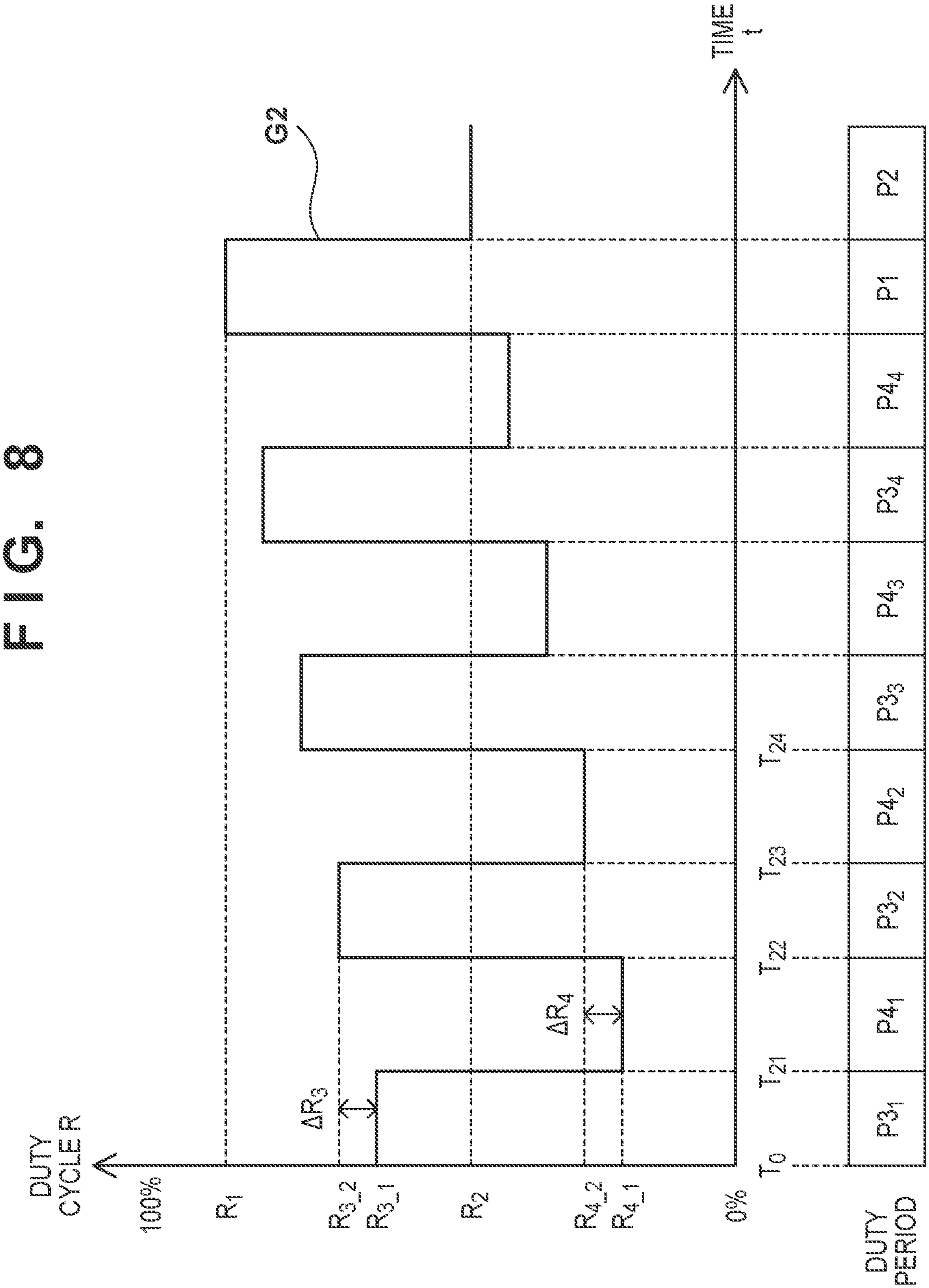
FIG. 8 is a graph representing an example of a change over time in a duty cycle of power supply to the solenoid according to a second embodiment.

FIG. 8 illustrates a graph representing an example of a change in the duty cycle of power supply to the solenoid 141 over time according to the present embodiment. Similarly to the graph G1 of FIG. 5, a horizontal axis of a graph G2 of FIG. 8 represents an elapse of time, and a vertical axis represents the duty cycle of power supply to the solenoid 141 in percentage. In the example of FIG. 8, a pair of a third duty period $P3_i$ in which current is supplied to the solenoid 141 at a third duty cycle $R_{3\_i}$ and a fourth duty period $P4_i$ in which current is supplied to the solenoid 141 at a fourth duty cycle $R_{4\_i}$ are repeated four times (i=1, 2, 3, 4). Note that the number of repetitions of the third duty period $P3_i$ and the fourth duty period $P4_i$ may be less than four times or may be more than four times. The third duty cycle $R_{3\_i}$ in second and later rounds (i=2) of the third duty period $P3_i$ is larger than the third duty cycle $R_{3\_i}$ in an immediately preceding third duty period $P3_i$. That is, $R_{3\_i}>R_{3\_i-1}$. The fourth duty cycle $R_{4\_i}$ in second and later rounds (i≥2) of the fourth duty period $P4_i$ is larger than the fourth duty cycle $R_{4\_i}$ in an immediately preceding fourth duty period $P4_i$. That is, $R_{4\_i}>R_{4\_i-1}$.

The time $T_0$ is a timing at which power supply to the solenoid 141 is started. In a first third period P31 from the time $T_0$ to a time $T_{21}$, the conveyance control unit 130 supplies current to the solenoid 141 at a third duty cycle $R_{3\_1}$. Next, in a first fourth period P41 from the time $T_{21}$ to a time $T_{22}$, the conveyance control unit 130 supplies current to the solenoid 141 at a fourth duty cycle $R_{4\_1}$, which is lower than the third duty cycle $R_{3\_1}$.

Next, in a second third period P32 from the time $T_{22}$ to a time $T_{23}$, the conveyance control unit 130 supplies current to the solenoid 141 at a third duty cycle $R_{3\_2}$. The third duty cycle $R_{3\_2}$ is increased by an offset $\Delta R_3$ from the third duty cycle $R_{3\_1}$. Next, in a second fourth period P42 from the time $T_{23}$ to a time $T_{24}$, the conveyance control unit 130 supplies current to the solenoid 141 at a fourth duty cycle $R_{4\_2}$, which is lower than the third duty cycle $R_{3\_2}$. The fourth duty cycle $R_{4\_2}$ is increased by an offset $\Delta R_4$ from the fourth duty cycle $R_{4\_1}$.

Thereafter, also in a third period $P3_3$ and fourth period $P4_3$ and in a fourth third period $P3_4$ and fourth period $P4_4$, power supply to the solenoid 141 is performed at a respective increased duty cycle. Next, in a first period P1, power supply to the solenoid 141 is performed at the first duty cycle $R_1$, and furthermore, in a second period P2, power supply to the solenoid 141 is performed at the second duty cycle $R_2$. The second period P2 continues until power supply to the solenoid 141 is stopped in order to resume the transmission of the driving force to the double-sided conveyance roller pair 24.

It is desirable that the third duty cycles $R_{3\_i}$ in the four third periods P3; all correspond to a strength of the magnetic force of the solenoid 141 at which there is a possibility to overcome the driving force of the motor 132 and cause the second movable member 145 to separate from the transmission mechanism 140 (cam 151). Whether or not the second movable member 145 separates from the transmission mechanism 140 in each third period P3; is dependent on uncertain factors, such as mechanical and electrical variations and effects of an increase in temperature. That is, in a situation in which it is easier for the second movable member 145 to separate from the transmission mechanism 140, the second movable member 145 may separate from the transmission mechanism 140 in the first third period P31. On the other hand, in a situation in which it is harder for the second movable member 145 to separate from the transmission mechanism 140, the second movable member 145 may not separate from the transmission mechanism 140 in third period P3; and the second movable member 145 may separate from the transmission mechanism 140 in the first period P1. If the second movable member 145 separates in an early high duty period (third period), the second movable member 145 reaches the second position in an immediately succeeding low duty period (fourth period) and remains at the second position in the succeeding high duty periods and low duty periods. At the latest, the second movable member 145 separates from the transmission mechanism 140 in the first period, which is the last high duty period, and reaches the second position in the second period, which is the last low duty period.

The fourth duty cycles $R_{4\_i}$ in the four fourth periods $\mathbf{P4}_i$ all correspond to a strength of the magnetic force of the solenoid 141 necessary for displacing the second movable member 145 separated from the transmission mechanism 140 toward the second position. Similarly to the second duty cycle $R_2$, the fourth duty cycles $R_{4\_i}$ may be a sufficiently low value within a range in which it is possible to reliably displace the second movable member 145 toward the second position against the elastic force of the spring 142.

The storage unit 125 of the controller 110 stores in advance setting data indicating setting values, such as duty cycles (e.g., initial values $R_{3\_1}$, $R_{4\_1}$, and $\Delta R_3$, $\Delta R_4$) in respective duty periods and lengths of respective duty periods. In one practical example, the offset $\Delta R_3$ may be determined according to the following equation:

$$\Delta R_3 = (R_1 - R_{3\_1})/k$$

Similarly, the offset $\Delta R_4$ may be determined according to the following equation:

$$\Delta R_4 = (R_2 - R_{4\_1})/k$$

Here, a numerical value k is an integer greater than or equal to 1 representing the number of repetitions of the third period and the fourth period.

In another practical example, an offset for increasing the duty cycle may be different for each individual duty period and may be increased nonlinearly over time, for example. The storage unit 125 may store a table defining an increment (and a period length) of the duty cycle for each duty period. Alternatively, the duty cycle in the low duty period may be constant throughout all repetitions (i.e., $R_{4\_i}=R_2$).

3-2. Example of Flow of Processing

Figure 9:
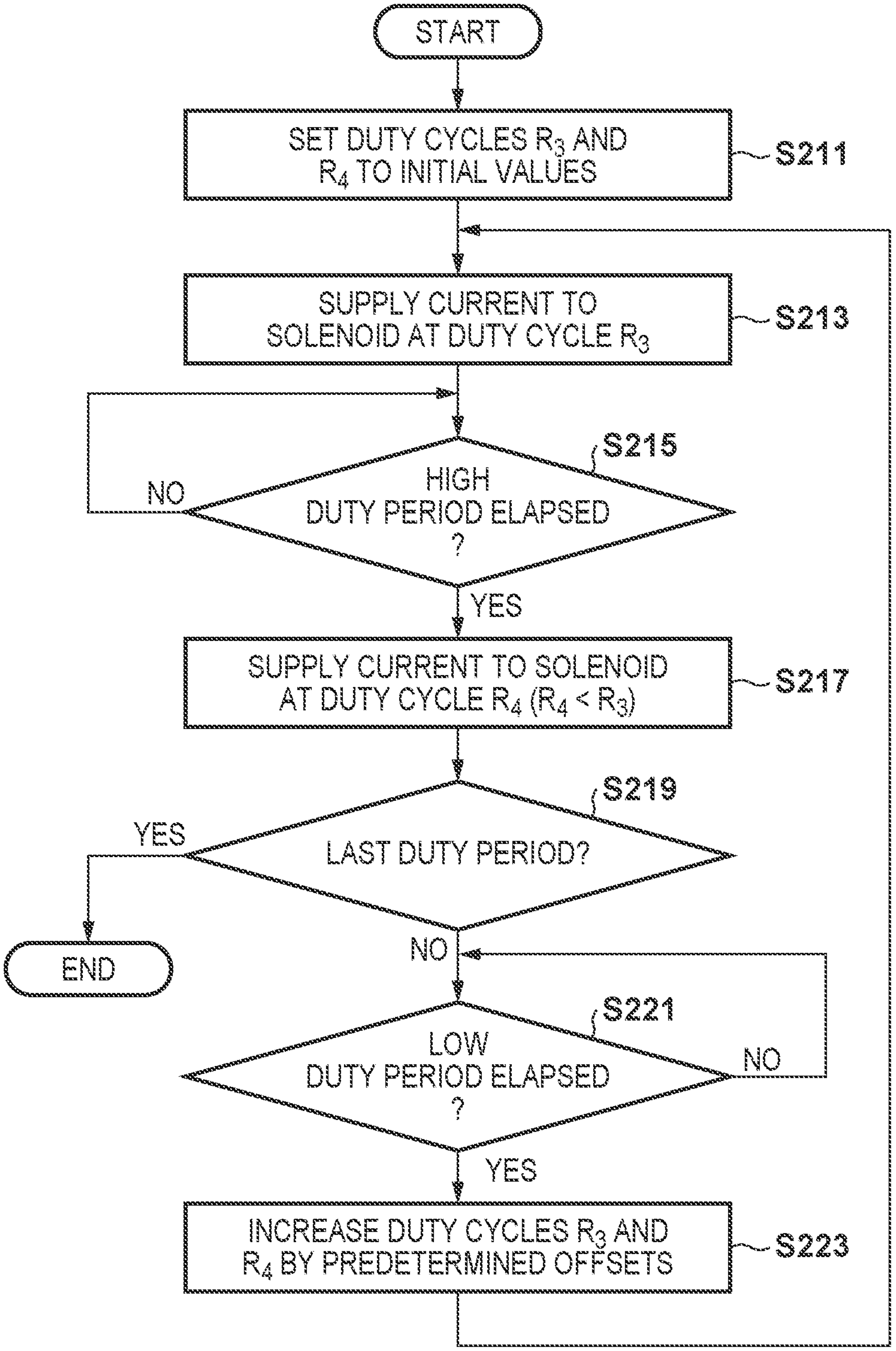
FIG. 9 is a flowchart illustrating an example of a flow of driving control processing according to the second embodiment.

FIG. 9 is a flowchart for explaining an example of a flow of driving control processing which may be executed by the conveyance control unit 130 according to the present embodiment. The driving control processing illustrated in FIG. 9 may be realized, for example, by the processing circuit of the controller 110 executing a computer program stored in advance in the storage unit 125.

First, in step S211, the conveyance control unit 130 sets the third duty cycle $R_3$ and the fourth duty cycle $R_4$ to respective initial values. Next, when a timing at which to stop the driven member operating in response to the driving force of the motor 132 arrives, in step S213 the conveyance control unit 130 starts power supply to the solenoid 141 at the third duty cycle $R_3$. In step S215, the conveyance control unit 130 monitors a timer and waits for the high duty period to elapse while continuing power supply at the third duty cycle $R_3$. When the high duty period elapses, in step S217 the conveyance control unit 130 decreases the duty cycle of power supply to the solenoid 141 from the third duty cycle $R_3$ to the fourth duty cycle $R_4$.

The processing subsequent thereto branches out in step S219 depending on whether or not the current period is the last duty period. If the current period is not the last duty period, in step S221 the conveyance control unit 130 continues to monitor the timer and waits for the low duty period to elapse while continuing to supply power at the fourth duty cycle $R_4$. When the low duty period elapses, in step S223 the conveyance control unit 130 increases the third duty cycle $R_3$ and the fourth duty cycle $R_4$ by respective predetermined offsets $\Delta R_3$ and $\Delta R_4$. If the next high duty period is the last high duty period, the third duty cycle $R_3$ will be equal to the first duty cycle $R_1$. Similarly, if the next low duty period is the last low duty period, the fourth duty cycle $R_4$ will be equal to the second duty cycle $R_2$. Then, the processing returns to step S213.

In step S219, if the current period is the last duty period, the driving control processing of FIG. 9 ends. In this case, the low duty period will be maintained until the transmission of the driving force to the driven member is resumed.

It should be noted that the present embodiment is even more beneficial in a practical example in which there are a plurality of solenoids for respectively switching states of a plurality of transmission mechanisms between the transmission state and the cut-off state. In such a practical example, the conveyance control unit 130 may commonly control the supply of current to the plurality of solenoids in the control sequence described with reference to FIG. 8. In that case, while one solenoid displaces a corresponding movable member in one high duty period, another solenoid may displace a corresponding movable member in another high duty period. That is, each of the plurality of movable members separates from a corresponding transmission mechanism at a timing at which power supply at a duty cycle greater than a value necessary for separating from the corresponding transmission mechanism is performed. That timing may be different from each other for the plurality of movable members. As a result, while using a common control sequence for power supply, it is possible to respectively displace the plurality of movable members at reduced speeds and effectively reduce respective operation noises.

3-3. Variation

According to the control of repetitive duty cycles described above, while it is possible to keep the acceleration for separating the movable member from the transmission mechanism to a minimum and reduce operation noise, a time until the movable member separates from the transmission mechanism may be longer compared with the first embodiment. Especially in a situation in which frequent actuation and stopping of the driven member is anticipated, if it takes a long time to switch the states of the transmission mechanism for transmitting the driving force, there is a risk that switching will be a productivity bottleneck.

Therefore, in one variation, the conveyance control unit 130 may control power supply from the DC generation circuit 131 to the solenoid 141 by selectively using one of the following two operation modes.

First operation mode (repetitive driving control (see FIG. 8)): power supply to the solenoid 141 is performed using a control sequence spanning the third period, the fourth period, the first period and the second period.

Second operation mode (non-repetitive driving control (see FIG. 5)): power supply to the solenoid 141 is performed using a control sequence constituted by only the first period, and the second period.

Typically, the first operation mode may be used in a situation where frequent actuation and stopping of the driven member is not anticipated. For example, the first operation mode may include the single-sided print mode in which the double-sided conveyance roller pair 24 is not involved in conveyance of a sheet. That is, if the single-sided print mode is designated at the time of execution of a job, the driving of the double-sided conveyance roller pair 24 is stopped while operation noise is reduced by repetition of the high duty period and the low duty period with the duty cycles increased step by step. Meanwhile, the second operation mode may include the double-sided print mode in which the double-sided conveyance roller pair 24 is involved in conveyance of a sheet. That is, if the double-sided print mode is designated, when stopping the driving of the double-sided conveyance roller pair 24 over a plurality of times during job execution, an operation time is shortened by non-repetitive driving control, and high productivity may be provided.

Generally, the greater the number of driven members (e.g., double-sided conveyance roller pair 24) that operate in response to the driving force of the motor, the greater the load on the motor. Therefore, in a situation in which there is little room for a torque of the motor 132 or a situation in which an increase in temperature is to be prevented, it is desirable to stop the driven member not involved in the execution of a job. As in the present variation, by switching the control sequences according to an anticipated frequency of actuation/stopping of the driven member, it is possible to realize a good balance between reduction of the load of the motor or prevention of an increase in temperature and high productivity.

3-4. Summary of Second Embodiment

In the second embodiment described in this section, when separating the movable member from the transmission mechanism, control for power supply to the solenoid for displacing the movable member is performed by a control sequence constituted by alternating repetitions of the high duty period and the low duty period. In addition, the duty cycle in a preceding high duty period is set to be lower than the duty cycle in a succeeding high duty period. Accordingly, the displacement of the movable member from the first position to the second position can be triggered with a relatively low duty cycle that does not include excessive margin. Thereby, it is possible to reduce the displacement speed of the movable member and effectively reduce operation noise.

For example, since resistance of the solenoid is temperature-dependent, when temperature changes, a strength of the magnetic force generated when the solenoid is supplied with power at the same duty cycle may also change. In order for the magnetic force of the solenoid to reliably displace the movable member in any temperature change, the margin of the duty cycle must be suitably large. In the control sequence according to the present embodiment, the displacement of the movable member is guaranteed by a sufficient margin in the last high duty period (first period), and the reduction of operation noise is also achieved by a lower duty cycle in an early high duty period (third period). It is similar for margins for tolerating other changes in environmental conditions and variations at the time of manufacturing of components.

4. THIRD EMBODIMENT

As described above, the duty cycle necessary for separating the movable member from the transmission mechanism is affected by mechanical and electrical variations in the product and may be different for each product. Further, when a temperature of the solenoid changes, a strength of the magnetic force generated when the solenoid is supplied with power at the same duty cycle may also change. In a third embodiment to be described in this section, instead of guaranteeing reliable displacement of the movable member solely by relying on the margin of the duty cycle to address such causes of variations in a required duty cycle, a mechanism for adaptively adjusting the duty cycle is incorporated.

Figure 10:
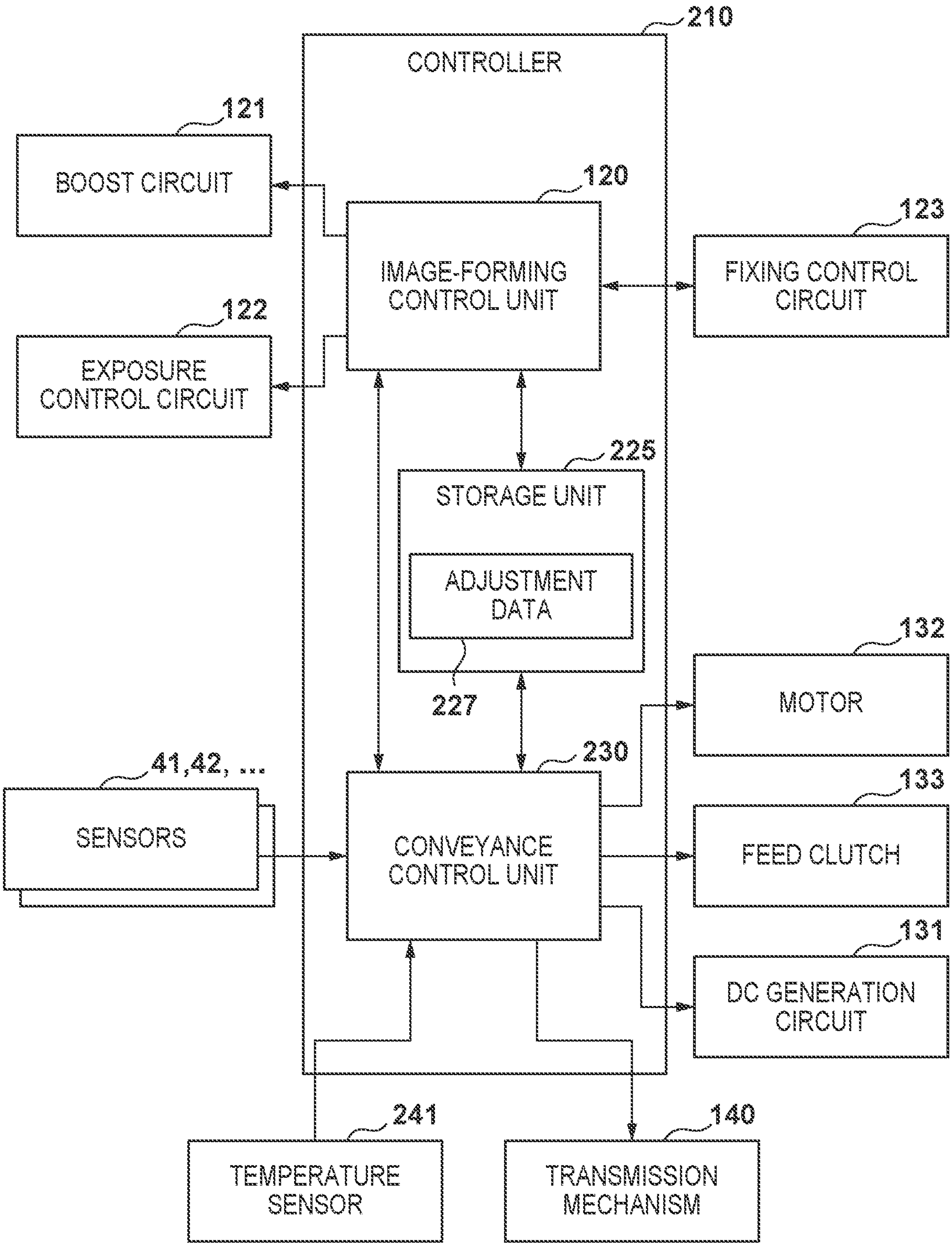
FIG. 10 is a block diagram illustrating an example of a configuration of a control function of the image-forming apparatus according to a third embodiment.

A configuration of the transmission mechanism and an overall configuration of the image-forming apparatus 100 according to the third embodiment may be similar to those of the first embodiment and the second embodiment. FIG. 10 is a block diagram illustrating an example of a configuration of a control function of the image-forming apparatus 100 according to the third embodiment. A controller 210 illustrated in FIG. 10 is a driving control unit that controls driving of various members of the image-forming apparatus 100. Similarly to the controller 110 according to the first embodiment, the controller 210 may include one or both of a general-purpose processing circuit and a dedicated processing circuit. Referring to FIG. 10, the controller 210 includes the image-forming control unit 120, a storage unit 225, and a conveyance control unit 230.

The storage unit 225 is a storage unit including any combination of a RAM, a ROM and an HDD. The storage unit 225 stores one or more control programs and various kinds of data. In particular, in the present embodiment, the storage unit 225 stores adjustment data 227. An example of a configuration of the adjustment data 227 will be described in detail below.

The controller 210, more specifically the conveyance control unit 230, is connected to the sensors 41, 42, . . . , the DC generation circuit 131, the motor 132, the feed clutch 133, the transmission mechanism 140, and a temperature sensor 241. The temperature sensor 241 is a measurement unit that measures a temperature of the solenoid 141 (see FIG. 4). The temperature sensor 241 may be, for example, a thermistor or a thermocouple disposed in a vicinity of the solenoid 141.

The conveyance control unit 230 is configured to control the supply of current to the solenoid 141. When cutting off the transmission of the driving force from the motor 132 to the double-sided conveyance roller pair 24, the conveyance control unit 230 displaces the second movable member 145 from the first position to the second position by supplying current from the DC generation circuit 131 to the solenoid 141. At this time, the conveyance control unit 230 changes a supply amount of current to the solenoid 141 over time in order to reduce a pivot speed of the second movable member 145 after being separated from the transmission mechanism 140. As a first example, the conveyance control unit 230 may decrease the duty cycle of power supply to the solenoid 141 from the first duty cycle $R_1$ to the second duty cycle $R_2$ according to the non-repetitive driving control in the first embodiment. As a second example, the conveyance control unit 230 may alternately repeat the high duty period and the low duty period a plurality of times according to the repetitive driving control in the second embodiment. However, in either example, the conveyance control unit 230 adaptively determines at least one duty cycle based on the adjustment data 227 stored in advance in the storage unit 225.

The adjustment of the duty cycle in the present embodiment may include at least one of the following:

- Correction for compensating for manufacturing variations
- Adjustment according to a change in the required duty cycle caused by a temperature change In the first example in which non-repetitive driving control is performed, the conveyance control unit 230 may determine at least one of the first duty cycle $R_1$ and the second duty cycle $R_2$ based on the adjustment data 227. In the second example in which repetitive driving control is performed, the conveyance control unit 230 may determine at least one of the first duty cycle $R_1$, the second duty cycle $R_2$, the third duty cycle $R_3$, and the fourth duty cycle $R_4$ based on the adjustment data 227. The adjustment according to a change in the required duty cycle due to a temperature change can be made further based on the temperature of the solenoid 141 as measured by the temperature sensor 241. That is, in the first example, the conveyance control unit 230 can adjust at least one of the first duty cycle $R_1$ and the second duty cycle $R_2$ based on a signal outputted from the temperature sensor 241. Further, in the second example, the conveyance control unit 230 can adjust at least one of the first duty cycle $R_1$, the second duty cycle $R_2$, the third duty cycle $R_3$, and the fourth duty cycle $R_4$ based on a signal outputted from the temperature sensor 241.

Figures 11, 12:
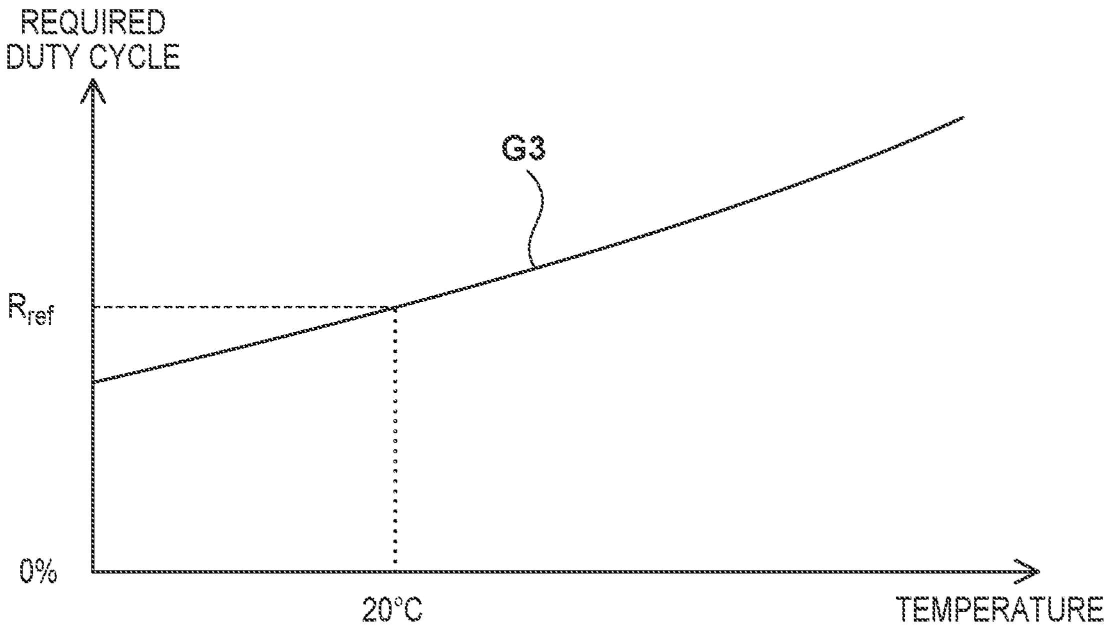
FIG. 11 is an explanatory diagram illustrating an example of a configuration of adjustment data used for adjusting the duty cycle.
FIG. 12 is a graph representing a relationship between a temperature of the solenoid and the duty cycle necessary for displacing the movable member.

FIG. 11 illustrates an example of a configuration of the adjustment data 227 on a premise of repetitive driving control. Referring to FIG. 11, the adjustment data 227 includes parameters, "reference value", "correction value", and "adjustment coefficient" for each of the first, second, third, and fourth duty cycles. The "reference value" indicates a value of the duty cycle to be set when it is assumed that there is no variation in the product at a reference temperature determined in advance. The reference temperature may be, for example, 20° C. Note that, regarding the third duty cycle and the fourth duty cycle, an initial value before an increase may be indicated as the reference value. The "correction value" indicates a value to be added to the reference value of the duty cycle in order to compensate for the effect of variations in the product. Correction values $X_1$, $X_2$, $X_3$ and $X_4$ of the respective duty cycles may be determined based on, for example, variations measured in a test after manufacturing of the product and written in the storage unit 225 (e.g., non-volatile memory). The "adjustment coefficient" indicates a coefficient for adjustment according to a change in the required duty cycle caused by a temperature change.

FIG. 12 illustrates a graph G3 representing a relationship between a temperature of the solenoids and the duty cycle necessary for separating the second movable member 145 from the transmission mechanism 140. The graph G3 indicates a required duty cycle $R_{ref}$ when the solenoid temperature is 20° C., and the required duty cycle increases as the temperature increases. In a practically possible temperature range, a change in the required duty cycle with respect to a temperature change may be regarded as linear. Accordingly, it is possible to derive a duty cycle suitable for a temperature after change by: i) setting the reference temperature to 20° C.; and ii) adding, to a reference value $R_{ref}$ (or a sum of the reference value and the correction value), an adjustment amount obtained by multiplying a temperature change from the reference temperature by an adjustment coefficient corresponding to the slope of the graph G3. Alternatively, a more complex duty cycle adjustment model may be used according to temperature characteristics of the solenoid 141. In the example of FIG. 11, different adjustment coefficients $\alpha_1$, $\alpha_2$, $\alpha_3$, and $\alpha_4$ are indicated for the first, second, third, and fourth duty cycles, but a common adjustment coefficient may be used for adjustment of a plurality of duty cycles, instead.

It should be noted that the configuration of the adjustment data 227 illustrated in FIG. 11 is only an example. The adjustment data 227 may further include, for example, correction values for the offsets $\Delta R_3$ and $\Delta R_4$ for repetitive driving control. In addition, the storage unit 225 may store in advance a plurality of sets of the adjustment data 227 respectively corresponding to a plurality of candidate values for attributes such as the type or the number of turns of the solenoid or the type of the motor. In that case, the conveyance control unit 230 may read the data set corresponding to the attribute of the solenoid 141 or the motor 132 to be controlled from the storage unit 225 and use it to determine the duty cycle.

In addition, the temperature of the solenoid 141 may be estimated based on a history of power supply to the solenoid 141 and/or an environmental temperature instead of being measured directly by the temperature sensor 241.

In the third embodiment described in this section, the duty cycle in the control for power supply to the solenoid for separating the movable member from the transmission mechanism is adjusted to one or both of variations in the product and a change in temperature of the solenoid. Accordingly, the need to include an excessively large margin in the duty cycle is eliminated, and so, it is possible to reduce the displacement speed of the movable member or shorten the time it takes to trigger the displacement of the movable member.

It should be noted that a configuration including the transmission mechanism 140, the switching apparatus 160, and the controller 110 or 210 (more specifically, conveyance control unit 130 or 230) may be referred to as a driving control apparatus. That is, the image-forming apparatus 100 includes a driving control apparatus. The driving control apparatus may include the motor 132, a driven member, and a power source that outputs current to be supplied to the solenoid 141.

5. OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-078039, filed on May 10, 2023 which is hereby incorporated by reference herein in its entirety.

What is claimed is:

1. A driving control apparatus comprising:

a movable member that can be displaced between a first position and a second position;

a solenoid configured to displace the movable member at the first position to the second position by a magnetic force;

a control unit configured to control supply of current from a power source to the solenoid; and a transmission mechanism configured to transition between a first state and a second state according to a position of the movable member, the transmission mechanism being further configured to:

transmit a driving force of a motor to a driven member in one of the first state and the second state, and not transmit the driving force of the motor to the driven member in the other of the first state and the second state, wherein when the solenoid displaces the movable member from the first position to the second position, the control unit is configured to in a third period, supply current to the solenoid at a third duty cycle which is lower than a first duty cycle and higher than a second duty cycle, in a fourth period which is after the third period, supply current to the solenoid at a fourth duty cycle which is lower than the third duty cycle, in a first period which is after the fourth period, supply current to the solenoid at the first duty cycle such that the movable member is displaced from the first position toward the second position, and in a second period which is started after the first period and before the movable member reaches the second position, supply current to the solenoid at the second duty cycle which is lower than the first duty cycle.

2. The driving control apparatus according to claim 1, wherein the control unit is configured to, before the first period, repeats the third period and the fourth period a plurality of times, and the third duty cycle is increased for each repetition.

3. The driving control apparatus according to claim 1, wherein the control unit is configured to in first operation mode, supply current to the solenoid in a control sequence spanning the third period, the fourth period, the first period and the second period, and in second operation mode which is different from the first operation mode, supply current to the solenoid in a control sequence only constituted by the first period and the second period.

4. The driving control apparatus according to claim 3, wherein the driving control apparatus is used in an image-forming apparatus configured to form an image on a sheet, the first operation mode includes single-sided print mode, the second operation mode includes double-sided print mode, and the driven member is a roller that does not convey a sheet in the single-sided print mode and conveys a sheet in the double-sided print mode.

5. The driving control apparatus according to claim 1, wherein the control unit is configured to displace a plurality of movable members using a plurality of solenoids, respectively, according to a control sequence spanning the third period, the fourth period, the first period and the second period.

6. The driving control apparatus according to claim 1, further comprising:

a sensor configured to detect a temperature, wherein the control unit is configured to determine at least one duty cycle of the first duty cycle, the second duty cycle, the third duty cycle, and the fourth duty cycle based on a signal outputted from the sensor.

7. The driving control apparatus according to claim 1, wherein the driving force of the motor is applied to the transmission mechanism in both the first state and the second state.

8. The driving control apparatus according to claim 1, wherein the transmission mechanism includes a locking portion configured to be locked by the movable member at the first position, in the first state, the locking portion and the movable member are engaged, and in the second state, the locking portion and the movable member are not engaged.

9. The driving control apparatus according to claim 8, wherein the second duty cycle corresponds to a strength of the magnetic force of the solenoid at which it is possible to displace the movable member toward the second position in a state in which engagement between the locking portion and the movable member is released.

10. The driving control apparatus according to claim 8, further comprising:

a driving member connected to the movable member and configured to be moved by the magnetic force of the solenoid so as to move the movable member.

11. The driving control apparatus according to claim 1, further comprising:

a sensor configured to detect a temperature, wherein the control unit is configured to determine at least one duty cycle of the first duty cycle and the second duty cycle based on a signal outputted from the sensor.

12. The driving control apparatus according to claim 1, further comprising:

a storage unit configured to store in advance a correction value, wherein the control unit is configured to adjust at least one duty cycle based on the correction value stored in the storage unit.

13. An image-forming apparatus comprising:

the driving control apparatus according to claim 1; and an image-forming unit configured to form an image on a sheet.

14. The image-forming apparatus according to claim 13, wherein the driven member is a roller configured to convey the sheet.

* * * * *